(12) United States Patent
Hajrovic

(10) Patent No.: US 8,752,873 B2
(45) Date of Patent: Jun. 17, 2014

(54) GRIPPER DEVICE FOR TRANSPORTING RACKS

(75) Inventor: Midhat Hajrovic, Einhausen (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 0 days.

(21) Appl. No.: 13/469,211

(22) Filed: May 11, 2012

(65) Prior Publication Data

US 2012/0286531 A1 Nov. 15, 2012

(30) Foreign Application Priority Data

May 13, 2011 (DE) .......... 10 2011 110 250

(51) Int. Cl.
*B25J 15/02* (2006.01)
(52) U.S. Cl.
USPC .......... 294/115; 294/116; 294/203; 294/902; 294/907
(58) Field of Classification Search
USPC ......... 294/2, 3, 106, 115, 116, 203, 902, 907; 901/38, 39, 46
See application file for complete search history.

(56) References Cited

U.S. PATENT DOCUMENTS

| | | | | |
|---|---|---|---|---|
| 3,370,213 A * | 2/1968 | Rose | ............... | 318/513 |
| 3,630,391 A * | 12/1971 | Wilson | ............... | 414/744.8 |
| 4,557,661 A * | 12/1985 | Fischer et al. | ............... | 414/730 |
| 4,682,805 A * | 7/1987 | Reynolds | ............... | 294/86.4 |
| 4,730,861 A * | 3/1988 | Spencer | ............... | 294/86.4 |
| 4,784,422 A * | 11/1988 | Jones et al. | ............... | 294/106 |
| 5,050,919 A * | 9/1991 | Yakou | ............... | 294/2 |
| 5,178,431 A * | 1/1993 | Voellmer | ............... | 294/86.4 |
| 5,588,688 A | 12/1996 | Jacobsen et al. | | |
| 5,669,653 A * | 9/1997 | Penisson | ............... | 294/116 |
| 6,015,174 A * | 1/2000 | Raes et al. | ............... | 294/2 |
| 6,745,916 B2 | 6/2004 | Plank et al. | | |
| 6,887,428 B2 | 5/2005 | Barth et al. | | |
| 7,014,235 B1 * | 3/2006 | Ostwald | ............... | 294/119.1 |
| 7,422,411 B2 | 9/2008 | Downs et al. | | |
| 7,602,174 B2 * | 10/2009 | Holcomb et al. | ............... | 324/207.16 |
| 7,896,602 B2 | 3/2011 | Rebstock | | |
| 2002/0051735 A1 | 5/2002 | Dorenkamp et al. | | |
| 2003/0047567 A1 | 3/2003 | Plank et al. | | |

FOREIGN PATENT DOCUMENTS

| | | |
|---|---|---|
| GB | 2366376 | 3/2002 |
| GB | 2486937 | 7/2012 |
| JP | 2011033367 | 2/2011 |
| WO | 9920995 | 4/1999 |

* cited by examiner

*Primary Examiner* — Dean Kramer
(74) *Attorney, Agent, or Firm* — Hodgson Russ LLP

(57) ABSTRACT

The present invention relates to a gripper device for transporting a rack (3) for microscope slides (4), in particular in systems for preparing tissue samples for histological examinations, the gripper device having a gripping mechanism including a pair of gripping arms (2), whose ends are configured as gripping sections (7) for gripping the rack. In order to provide a gripper device which can be used in a versatile manner in automated stainers and coverslippers and contributes to reducing the cost of manufacture, it is proposed that the gripping sections (7) be provided with first profiles (17) for gripping the rack (3) in a vertical position and second profiles (18) for gripping the rack (3) in a horizontal position.

16 Claims, 5 Drawing Sheets

GRIPPER DEVICE FOR TRANSPORTING RACKS

CROSS REFERENCE TO RELATED APPLICATIONS

This application claims priority of German patent application number 10 2011 110 250.0 filed May 13, 2011, the entire disclosure of which is incorporated by reference herein.

FIELD OF THE INVENTION

The present invention relates to a gripper device for transporting a rack for microscope slides, in particular in systems for preparing tissue samples for histological examinations, the gripper device having a gripping mechanism including a pair of gripping arms, whose ends are configured as gripping sections for gripping the rack.

BACKGROUND OF THE INVENTION

Such devices are used, in particular, in systems where stained specimens or tissue samples, such as histological sections, placed on slides are provided with a cover slip for later analysis under a microscope. The staining of the specimens is performed in automated stainers, in which the slides carrying the tissue samples are sorted into racks or slide holders and immersed therewith in a staining container. During this process, the slides are arranged vertically side by side in the horizontally oriented rack. The racks mainly used for this purpose have a basket which is suspended from a hinged handle by which a gripping and transport device may grasp and transport the rack. This handle also serves as a closure mechanism which prevents accidental removal of the slides from the rack. After staining, the rack is transferred to an automated coverslipper where the coverslipping process takes place.

Prior to coverslipping, the slides are typically first deposited in input cuvettes containing solvent (xylene) in order to improve the flow properties of the mounting medium used during coverslipping. Then, the rack containing the slides is transported to a coverslipping station where, initially, the mounting medium, a glue, or the like, is applied to the slide, after which a cover slip is placed thereon to seal the tissue sample. In order to prevent the mounting medium from running off the slides, it is necessary to orient the slide horizontally. To this end, the entire rack is turned, thereby also tilting the slides into a horizontal orientation (a procedure referred to as "rack processing"). Subsequently, the rack may be moved to a coverslipping station by a gripping and transport device, and the coverslipping process may be started.

From German Patent Application DE 101 44 041 A1 there is known a transport device which transfers a rack from a stainer to a coverslipper and lowers the rack into the coverslipper. There, the rack, together with the slides, is lowered into a trough containing solvent. The coverslipper detects the rack and starts the coverslipping operation. Once all slides have been coverslipped and deposited into separate output racks in the coverslipper, the empty rack is transported away. The transport device is formed by a rail, parallel to the back wall of the loading station, on which a gripper for the racks is displaceable perpendicular to and parallel to the rail. The gripper has a groove that snaps into an angled piece of the rack, such that the rack is retained on one side only.

Another transport device for handling slides placed in a rack is described in German Patent Application DE 100 41 230 A1. This transport device is used for loading and removing racks into/from a processing station and for transferring the racks to a downstream apparatus. The transport device is embodied as a robot arm having a gripper at the end thereof. The robot arms are constituted by a plurality of partial arms and are arranged on a vertical shaft such that they are vertically adjustable and rotatable thereon. The transport device grasps the racks, lifts them and transports them to the next station. In this connection, the function of the gripper device is limited to lifting the racks and transporting them further on. However, this device is not suited for rack processing purposes and cannot be used in coverslippers where the entire rack is turned and subsequently transferred to the coverslipping station. Rather, an additional gripper device specifically tailored to the turned rack would be needed, making the entire system more costly and complex.

SUMMARY OF THE INVENTION

It is, therefore, an object of the present invention to provide a gripper device of the above-mentioned type which can be used in a versatile manner in automated stainers and coverslippers and contributes to reducing the cost of manufacture.

This object is achieved according to the present invention in that the gripping sections are provided with separate first and second profiles, the first profile being configured for gripping the rack in a vertical position, and the second profile being configured for gripping the rack in a horizontal position. Thus, the functions of several transport devices having different gripping members can advantageously be integrated into one transport device having only one gripper device. The second profile is configured such that a horizontally oriented rack may be grasped and transported, for example, by its handle, such as is frequently required in stainers where the entire rack is immersed in a staining container. The first profile is configured for grasping the rack in the vertical orientation, which allows the rack to be transferred to or inserted into specific processing stations of the coverslipper. Since the rack can be grasped at different positions, it is possible to satisfy a wide variety of requirements with respect to transport in automated stainers and coverslippers. Instead of using multiple transport systems having differently configured grippers, one single transport device may be used in versatile manner. For example, a rack coming from a stainer may first be transported to a coverslipper and deposited at a suitable position therein. The rack may be turned by a separate rotating device in order to orient the slides horizontally for the subsequent coverslipping process. The rack may then be transferred to a coverslipping station by the same gripper device. The inventive design significantly reduces the cost of manufacture of such automated systems.

It has proven to be particularly advantageous when the second profile is configured for gripping a rack handle. This allows a high level of safety during transport and makes it easier to transport the racks when they are introduced into the automated system. In a further embodiment, the first profile is configured for gripping the rack basket and is advantageously matched to the outer contour of the rack basket.

In yet another embodiment of the present invention, the gripping arms are connected to a translationally movable thrust member, so that the gripping arms can be opened and closed by a translational movement of the thrust member. Thus, the gripper device can be made small and compact, and at the same time simple in construction. Moreover, it is possible to convert small actuating forces into large gripping forces. The drive has correspondingly small dimensions.

In a further development of the inventive concept, the thrust member may be a conical threaded nut which is threaded onto a threaded spindle and guided in the gripper device such that it is translationally movable but rotationally immovable, so that a rotational movement of the threaded spindle produces a translational movement of the threaded nut. While other devices require motor or pneumatic drives dimensioned large enough to provide large gripping forces, the drive mechanism of the present invention is capable of producing large forces while keeping complexity and space requirements to a minimum.

Advantageously, an electric, pneumatic or hydraulic drive is used for moving the thrust member. For example, it is possible to use a rotary drive for the threaded spindle. In this way, the requirement of small space at large gripping forces can be satisfied.

In order to keep the actuating forces as low as possible, a preloaded spring member is provided which holds the gripping arms in a closed or open position. Usable as such a spring member is, for example, a tension spring, a compression springs, or the like, so that the actuating forces to be exerted must act in only one direction.

It has turned out to be particularly advantageous if the thread pitch of the threaded spindle is selected such that the ratio between the driving force and the spreading force is approximately 0.2.

In another embodiment, in order to ensure particularly secure grasping and transport of the rack, a sensor, in particular an analog inductive sensor, is provided for monitoring the position of the thrust member or of the gripping arms.

BRIEF DESCRIPTION OF THE DRAWING VIEWS

The present invention will now be explained in more detail with reference to an exemplary embodiment illustrated in the drawing. All of the described and/or illustrated features constitute the subject matter of the present invention, either alone or in any combination, regardless of their combination in the claims or their references to preceding claims.

DETAILED DESCRIPTION OF THE INVENTION

Figure 1:
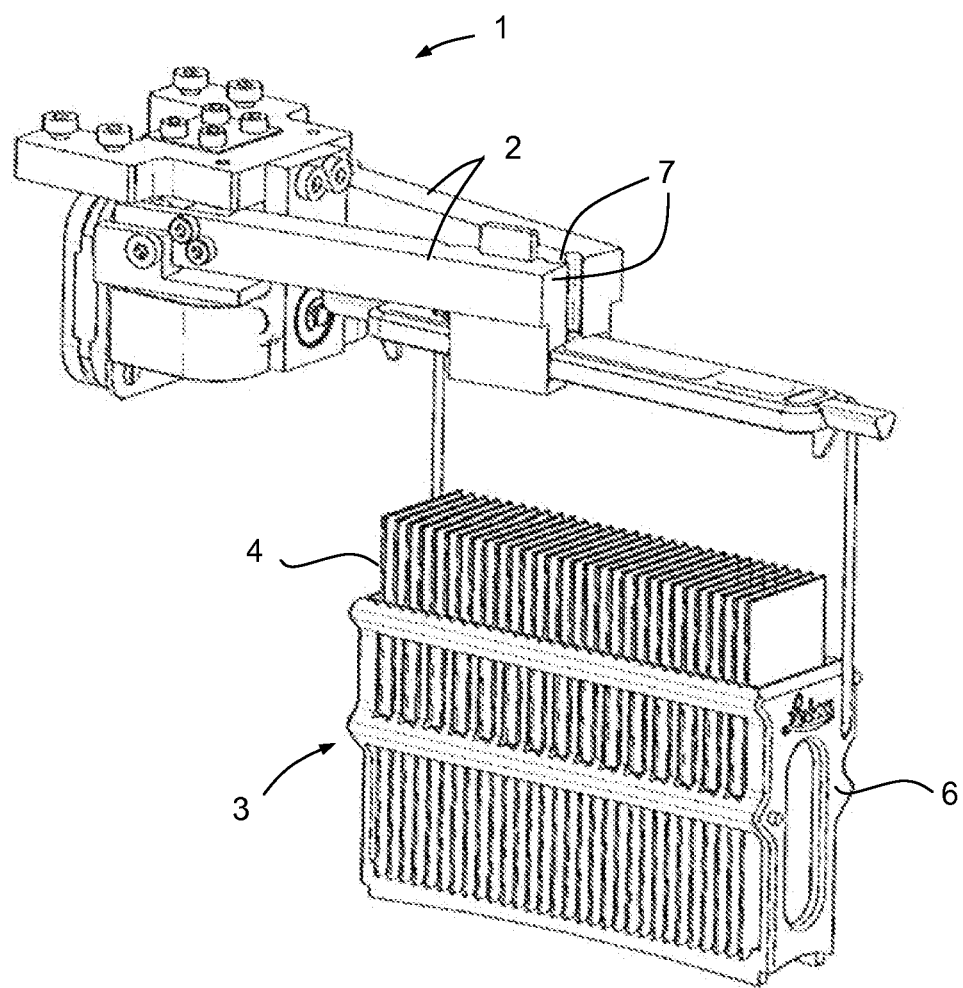
FIG. 1 is a perspective view of the gripper device of the present invention, shown with a horizontally oriented rack.

Gripper device 1, as shown in FIG. 1, has two gripping arms 2 for holding a rack 3, in which slides 4 are inserted vertically side by side. Rack 3 has a handle 5 from which is suspended a basket 6 of rack 3. The forward ends of gripper arms 2 are configured as gripping sections 7 for grasping handle 5. A transport device (not shown) connected to gripper device 1 can transport rack 3 by means of handle 5. In particular, when the rack is transported within a stainer, or when the rack is lowered into input cuvettes in a coverslipper and removed therefrom, transport is performed with the track in the horizontal orientation shown in FIG. 1, since the vertical orientation of slides 4 in rack 3 ensures that the stain can run off the tissue sample in the best possible way.

Figure 2:
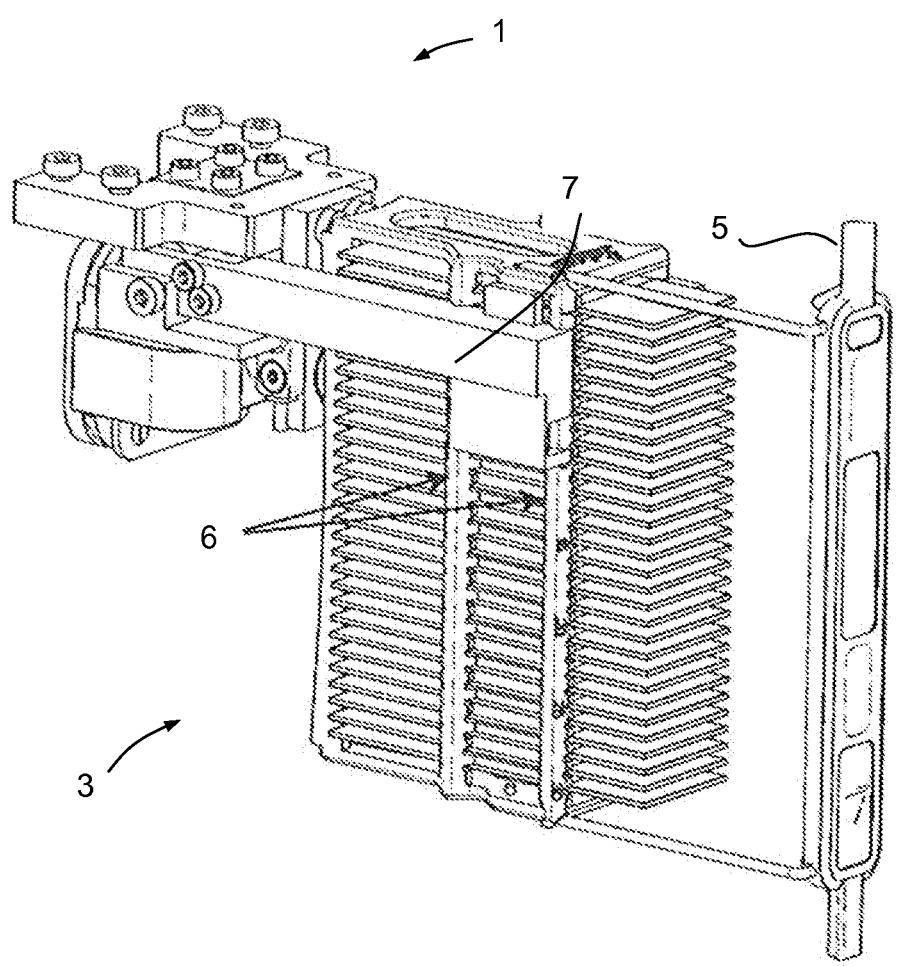
FIG. 2 is view similar to FIG. 1, showing the gripper device with a vertically oriented rack.

However, prior to a coverslipping operation, rack 3 must be turned in order to orient slides 4 horizontally. As shown in FIG. 2, gripper device 1 is also capable of grasping a rack 3 that has been turned. In this case, gripping sections 7 hold rack 3 at rack basket 6.

Figure 3:
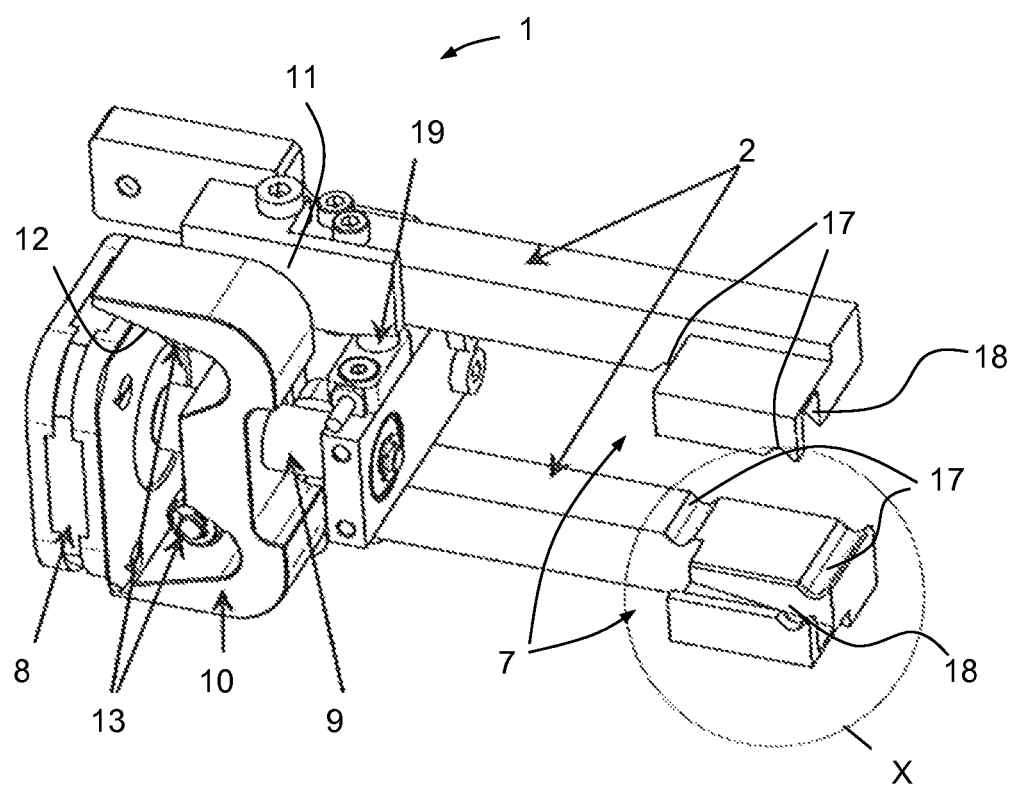
FIG. 3 is a perspective detailed view of the gripper device shown in FIG. 1.

FIG. 3 shows a more detailed representation of gripper device 1. The drive for the gripper device is provided by a stepper motor 8 to which is connected a spindle 9 having an external thread (not shown). A conical threaded nut 10 matching the external thread of spindle 9 is threaded onto spindle 9. Threaded nut 10 is guided in a guide region 11 in such a way that it is translationally movable but rotationally immovable in the gripper device. Because threaded nut 10 meshes with the thread of threaded spindle 9, the nut travels in a translational direction along threaded spindle 9 when the spindle is rotated by stepper motor 8. Depending on the direction of rotation, threaded nut 10 travels toward or away from stepper motor 8.

Figure 4A:
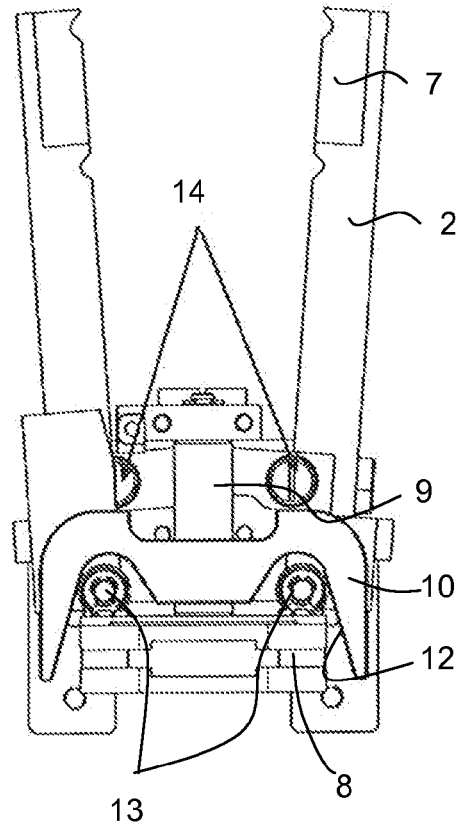
FIGS. 4a-4c are plan views showing the gripper device of FIG. 3 in three different positions of closure.
Figure 4B:
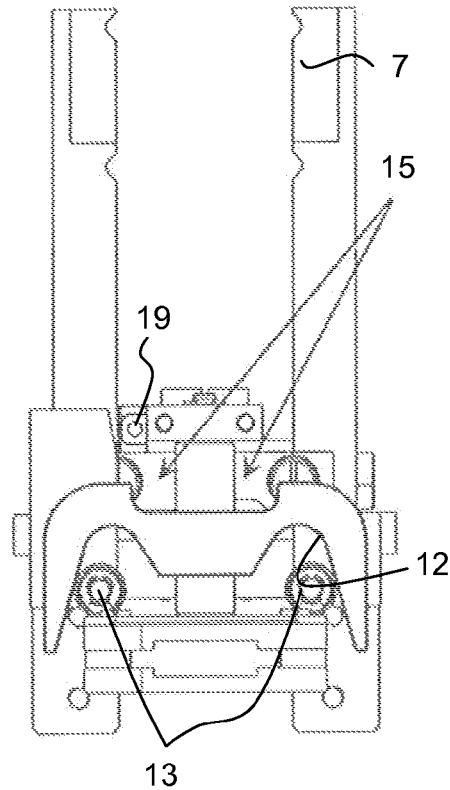
Figure 4C:
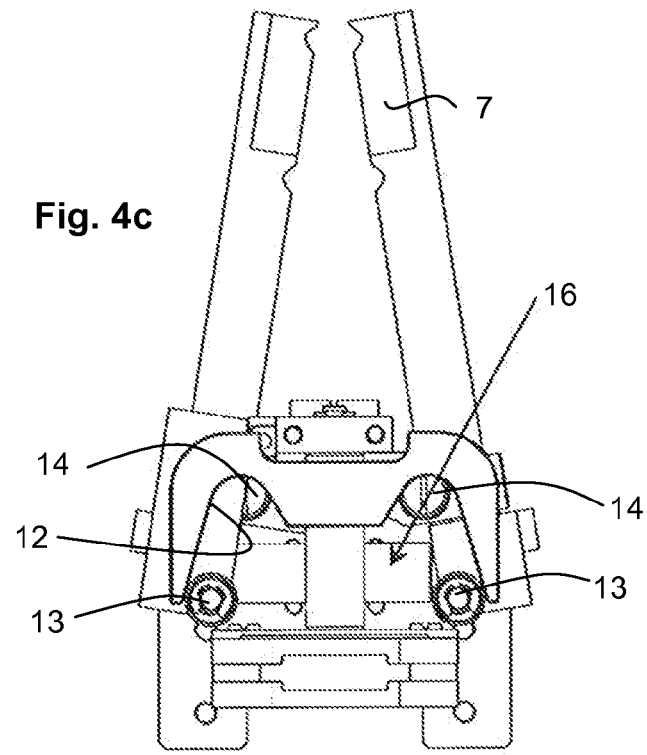

Threaded nut 10 is provided, on its inner side, with a conical portion 12 which tapers toward gripping sections 7. Conical portion 12 cooperates with two ball bearings 13 mounted on gripping arms 2. Ball bearings 13 are each disposed at the end of gripping arms 2 opposite gripping sections 7. As shown in FIGS. 4a through 4c, gripping arms 2 are each rotatable about a pivot 14. When threaded nut 10 is displaced, conical portion 12 cooperates with ball bearings 13. When threaded nut 10 moves rearward; i.e., in a direction toward stepper motor 8, conical portion 12 urges ball bearings 13 inwardly, whereby the rear portions of gripping arms 2 are also urged inwardly. In this process, gripping arms 2 rotate about pivot 14, thereby causing gripping sections 7 of gripping arms 2 to move apart, as shown in FIG. 4a.

FIG. 4a shows the gripper device in an open position where it is ready to grasp a rack. In this connection, the rack may be oriented horizontally or vertically. A toothed segment 15 is used to prevent unwanted rotation; i.e., to ensure synchronous movement of gripping arms 2.

In order to close the gripper device, threaded spindle 9 is turned in the opposite direction, thereby causing threaded nut 10 to move along threaded spindle 9 in a forward direction; i.e., away from drive 8. This is illustrated in FIGS. 4b through 4c. In this process, conical portion 12 is moved forward along with threaded nut 10, thereby allowing ball bearings 13 to move outwardly again. A compression spring 16 is disposed between gripping arms 2 to urge the end portions of gripping arms 2 outwardly along with ball bearings 13. The compression spring also creates a lever action about pivot 14, so that gripping sections 7 are urged towards each other. The normal forces acting between gripping sections 7 and rack 3 are applied solely by compression spring 16. Thus, the drive mechanism composed of stepper motor 8, threaded spindle 9 and threaded nut 10 is used primarily for adjusting the open and closed positions and for providing the force for the opening operation. The total amount of energy consumed during operation can be minimized correspondingly. Conical nut 10 is designed to provide a mechanical advantage of five, which means that the ratio between the driving force and the spreading force is approximately 0.2. Thus, the gripper can be opened with little force, yet provides a large closing force.

Figure 5:
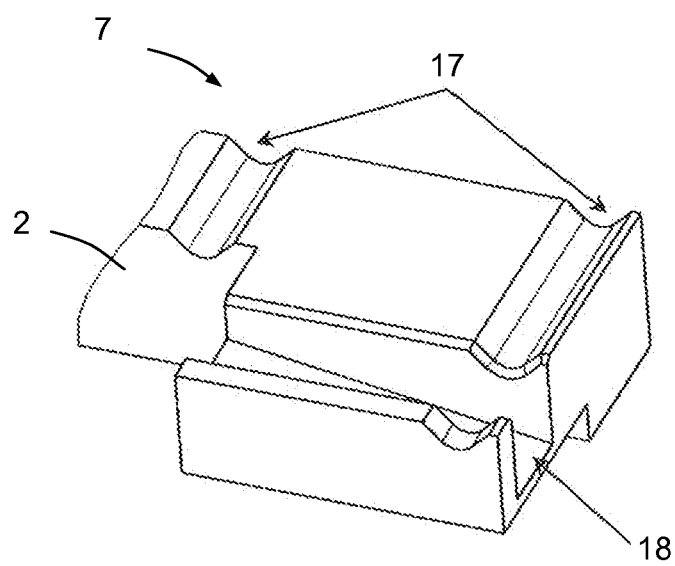
FIG. 5 is an enlarged view of detail X of FIG. 3.

FIG. 5 shows in detail the specially profiled gripping sections of gripping arms 2 from detail X of FIG. 3. The forward gripping sections 7 of gripping arms 2 are provided with first profiles 17 and second profiles 18. First profile 17 extends substantially transversely to gripping arm 2 and is composed of two trough-shaped recesses. Moreover, first profile 17 is matched to the outer contour of the rack basket 6 and is adapted for grasping it from the side, as shown in FIG. 2.

Second profile 18 is an indentation extending substantially parallel to gripping arm 2 and at an angle to the longitudinal axis of gripping arms 2. As shown in FIG. 1, second profile 18 serves to grasp rack handle 5. In this connection, the smaller width of rack handle 5 makes it necessary to move gripping arms 2 closer together, as a result of which gripping arms 2 are oblique to each other. However, since second profiles 18 extend in gripping arms 2 in oblique relationship thereto, they are parallel to each other when in the gripping position shown in FIG. 1, enabling the rack handle to be held securely. Second profile 18 is provided separately from first profile 17, which means that second profile 18 does not perform any function when first profile 17 engages rack basket 6. However, second profile 18 may also be designed to serve a securing function with regard to unwanted displacement of the grasped rack basket 6 so as to prevent it from slipping out downwardly.

An analog inductive sensor 19 monitors the position of threaded nut 10 during the gripping operation, enabling optimum control of the gripper device.

LIST OF REFERENCE NUMERALS

1 gripper device
2 gripping arm
3 rack
4 slide
5 rack handle
6 rack basket
7 gripping sections
8 stepper motor
9 threaded spindle
10 threaded nut
11 guide region
12 conical portion
13 ball bearing
14 pivot
15 toothed segment
16 compression spring
17 first profile
18 second profile
19 analog inductive sensor

What is claimed is:

1. A gripper device for transporting a rack (3) carrying microscope slides (4) in a system for preparing tissue samples for histological examinations, the gripper device comprising:
    a gripping mechanism including a pair of gripping arms (2), each gripping arm having an end configured as a gripping section (7) for gripping the rack;
    wherein each of the gripping sections (7) includes a first profile (17) extending in a first direction for gripping the rack (3) in a vertical position and a second profile (18) extending in a second direction for gripping the rack (3) in a horizontal position, the first direction being non-orthogonal relative to the second direction on at least one of the gripping sections;
    wherein at least one of the pair of gripping arms (2) is configured to pivot about a pivot point (14) for gripping the rack, the first profile (17) of each gripping section (7) being parallel to one another when the gripping arms (2) are in a first position, and the second profile (18) of each gripping section (7) being parallel to one another in a second position of the gripping arms (2), the second position being different than the first position.

2. The gripper device as recited in claim 1, wherein the second profile (18) for gripping the rack (3) in a horizontal position is configured for gripping a rack handle (5).

3. The gripper device as recited in claim 1, wherein the first profile (17) for gripping the rack (3) in a vertical position is configured for gripping a rack basket (6).

4. The gripper device as recited in claim 1, further comprising a translationally movable thrust member, wherein the gripping arms (2) are connected to the thrust member and the gripping arms (2) are opened and closed by a translational movement of the thrust member.

5. The gripper device as recited in claim 4, wherein the thrust member is a conical threaded nut (10) threaded onto a threaded spindle (9) and guided in the gripper device such that it is translationally movable but rotationally immovable, so that a rotational movement of the threaded spindle (9) produces a translational movement of the threaded nut (10).

6. The gripper device as recited in claim 5, further comprising an electric, pneumatic or hydraulic drive operable for moving the thrust member by rotating the threaded spindle (9).

7. The gripper device as recited in claim 5, further comprising a preloaded spring member (16) arranged to hold the gripping arms (2) in a closed or an open position.

8. The gripper device as recited in claim 5, wherein a thread pitch of the threaded spindle (9) is selected such that a ratio between a driving force and an arm spreading force is approximately 0.2.

9. The gripper device as recited in claim 4, further comprising a sensor (19) arranged to monitor a position of the thrust member or a position of the gripping arms (2).

10. The gripper device as recited in claim 9, wherein the sensor (19) is an analog inductive sensor.

11. The gripper device as recited in claim 1, wherein both of the gripping arms (2) are configured to pivot about a respective pivot point.

12. The gripper device as recited in claim 1, wherein in the first position, the pair of gripping arms are parallel to one another.

13. The gripper device as recited in claim 12, wherein in the second position, the pair of gripping arms are not parallel to one another.

14. The gripper device as recited in claim 1, wherein the first profile includes two parallel grooves.

15. The gripper device as recited in claim 14, wherein the first direction is noncoplanar relative to the second direction on at least one of the gripping sections.

16. The gripper device as recited in claim 14, wherein each gripping section (7) is fixed relative to each gripping arm (2).

* * * * *